(12) United States Patent
Elhage

(10) Patent No.: US 8,818,188 B2
(45) Date of Patent: Aug. 26, 2014

(54) TRAFFIC GENERATION AND ANALYSIS FOR ONU EMULATION

(71) Applicant: Hassan Elhage, San Jose, CA (US)

(72) Inventor: Hassan Elhage, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 210 days.

(21) Appl. No.: 13/645,955

(22) Filed: Oct. 5, 2012

(65) Prior Publication Data

US 2014/0099101 A1     Apr. 10, 2014

(51) Int. Cl.
*H04B 10/08*     (2006.01)

(52) U.S. Cl.
USPC .................................. 398/25; 398/58; 398/71

(58) Field of Classification Search
USPC ..................... 398/25, 58, 66, 70, 71
See application file for complete search history.

(56) References Cited

U.S. PATENT DOCUMENTS

| | | | |
|---|---|---|---|
| 2008/0025725 A1* | 1/2008 | Jette et al. ........................ | 398/71 |
| 2012/0177361 A1* | 7/2012 | Hirano et al. ..................... | 398/1 |
| 2012/0288280 A1* | 11/2012 | Sui ................................... | 398/66 |
| 2013/0232265 A1* | 9/2013 | Bourgart ........................ | 709/224 |
| 2013/0315593 A1* | 11/2013 | Lamb et al. ..................... | 398/66 |

OTHER PUBLICATIONS

"Gigabit-capable passive optical networks (GPON): General characteristics", *ITU-T, Telecommunicaiton Standardization Sector of ITU*, *G.984.1*, Mar. 2008, 32 pages.

* cited by examiner

*Primary Examiner* — Dzung Tran
(74) *Attorney, Agent, or Firm* — Blakely, Sokoloff, Taylor & Zafman, LLP

(57) ABSTRACT

An emulated Optical Network Unit (ONU) platform executes the functions of multiple emulated ONUs to enable traffic emulation in a Gigabit-capable Passive Optical Network (GPON) for data traffic, control traffic and management traffic. The emulated ONU platform generates OMCI messages, PLOAM messages, DBRu messages, data traffic and control traffic according to respective statistical specifications in respective profiles of the emulated ONUs. The emulated ONU platform formats and encapsulates the emulated traffic for upstream transmission to an OLT system according to dynamic bandwidth allocation instructions received from the OLT system. The emulated ONU platform then sends the emulated traffic upstream to the OLT system, and receives downstream traffic from the OLT system.

20 Claims, 8 Drawing Sheets

TRAFFIC GENERATION AND ANALYSIS FOR ONU EMULATION

TECHNICAL FIELD

Embodiments of the invention relate to network simulation; and more specifically, to an optical network unit (ONU) emulator in a Gigabit-capable Passive Optical Network (GPON).

BACKGROUND

A passive optical network (PON) consists of one or more optical line termination (OLT) systems (also referred to as OLTs), a number of optical network units (ONUs), and an optical distribution network (ODN) including fibers and splitters between the OLTs and the ONUs. Each OLT is a service provider node, and each ONU is a subscriber node. A PON is a widely-adopted architecture for economically delivering telecommunications services to individual subscribers or groups of subscribers. One common type of PON deployment is based on ITU-T G.984 (Gigabit-capable PON (GPON)).

In a GPON system, there is in general a one-to-many relationship between an OLT system and the ONUs. An example of an ONU is a Single Family Unit (SFU), which typically serves one house or apartment, or a Multi-Dueling Unit (MDU), which typically serves multiple houses or apartments.

Many GPON venders provide an OLT system and a portfolio of ONUs to address different market needs. Some ONU types are designed to provide both voice services (based on plain-old telephone service (POTS)) and data services; whereas other ONU types are designed to provide data services only, such as high speed internet access (HSIA), video and/or session initiation protocol (SIP) based services. Some ONU types are designed to include residential gateway capabilities; whereas other ONU types rely on an external third-party residential gateway. A typical leading GPON vendor may offer over twenty versions of ONU types to be supported by the same OLT system.

A typical OLT system when fully loaded may support up to tens of thousands of ONUs (e.g., 14×16×64=14,336 ONUs). To ensure that a fully loaded GPON OLT system meets the scalability, availability, reliability, performance and service quality requirements for different GPON markets where different ONU types are deployed, an equipment vendor often needs to test various traffic usage patterns and load conditions that are generated to/from the large number of ONUs. Using real field deployable ONUs in the lab (e.g., 14,336 ONUs) to test a fully loaded GPON OLT system becomes prohibitive with respect to the lab space, number of racks to stack the thousands of ONUs, number of cables, number of switches, human efforts to manage and operate the ONUs, and very high energy consumption.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

SUMMARY

Figure 1:
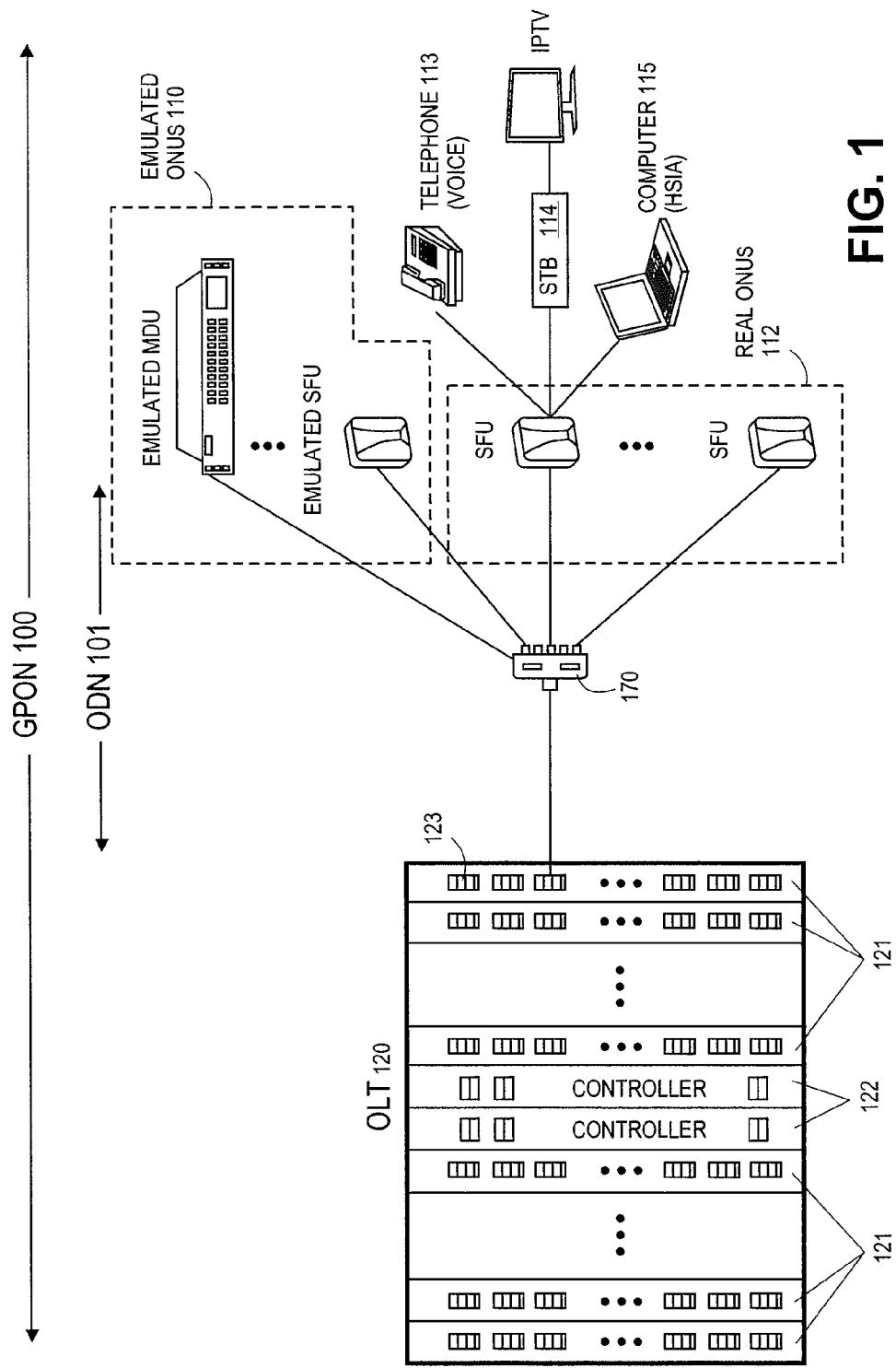
FIG. 1 illustrates an example of an ONU emulation system according to one embodiment of the invention.

An emulated ONU platform executes the functions of multiple emulated ONUs to enable traffic emulation in a Gigabit-capable Passive Optical Network (GPON). The emulated ONU platform includes multiple ONU emulator blocks, and each ONU emulator block includes circuitry to emulate multiple emulated ONUs simultaneously.

In one embodiment, a method performed by the emulated ONU platform comprising: generating ONU management control interface (OMCI) messages, Physical Layer Operation, Administration and Maintenance (PLOAM) messages, Dynamic Bandwidth Report upstream (DBRu) messages, data traffic and control traffic according to respective statistical specifications in respective profiles of the emulated ONUs. The method further comprising: formatting and encapsulating emulated traffic for upstream transmission to an OLT system according to dynamic bandwidth allocation instructions received from the OLT system, sending the emulated traffic upstream to the OLT system, and receiving downstream traffic from the OLT system.

In another embodiment, an emulated ONU platform comprises a plurality of ONU emulator blocks, memory within each of the ONU emulator blocks to store profiles of emulated ONUs, and traffic generation hardware within each of the ONU emulator blocks to emulate multiple ones of the emulated ONUs simultaneously. The traffic generation hardware is adapted to generate OMCI messages, PLOAM messages, DBRu messages, data traffic and control traffic according to respective statistical specifications in respective profiles of the emulated ONUs, format and encapsulate the emulated traffic for upstream transmission to an OLT system according to dynamic bandwidth allocation instructions received from the OLT system. The emulated ONU platform also comprises a plurality of GPON ports, which are adapted to send the emulated traffic upstream to the OLT system and receive downstream traffic from the OLT system.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a GPON ONU emulator that optimizes the testing of an OLT system (also referred to as an "OLT") in cost effective, flexible and user friendly ways. The ONU emulator allows end-users to test real-world scenarios using various traffic patterns and load conditions. Embodiments of the invention also provide a GPON ONU emulation test environment setup that can be used for testing a fully loaded GPON OLT system in the lab. The ONU emulator under test can generate upstream management traffic, control traffic and data traffic for transmission to an OLT, and can process downstream management traffic, control traffic and data traffic from the OLT. The generation of upstream traffic and processing of downstream traffic is performed according to respective profiles of emulated ONUs.

The ONU emulator described herein is capable of emulating a large number of GPON ONUs of various types concurrently. Thus, the ONU emulator can be used for testing the scalability, capacity, reliability, performance and functionality of a fully-loaded OLT. The ONU emulator provides tools and mechanisms for generating various traffic load conditions to allow simulation of various real-world scenarios and traffic patterns. Through the simulations, an end user can easily test various "what-if" scenarios and verify the impact of certain load conditions and traffic patterns on the OLT's behavior and functions.

Embodiments of the invention also allow the OLT performance to be tested under a variety of test conditions, including a combination of real network traffic and emulated network traffic. The OLT can be tested under a controlled level of load, and the effect of the emulated network traffic on the OLT and on the real ONUs can be observed and analyzed. For example, the OLT's dynamic bandwidth allocation function and bandwidth limitation can be tested under various emulated network traffic load, and the effect of the various emulated network traffic load on the real ONUs can be analyzed.

FIG. 1 illustrates an example of a GPON emulation system 100 that includes an OLT 120 coupled to multiple real ONUs 112 and emulated ONUs 110 via an Optical Distribution Network (ODN) 101 that includes one or more passive optical splitters 170. The real ONUs 112 are the ONUs installed on a customer's premise, such as a Single Family Unit (SFU) (which usually serves one house/apartment), or a Multi-Dwelling Unit (MDU) (which usually serves multiple houses/apartments). The term "real ONU" is used to indicate a field-deployable ONU that functions as customer-premise equipment such as telephone 113 (for voice communication), set-top box 114 (e.g., for IPTV) and computers 115 (for high-speed Internet access (HSIA)). On the other hand, an emulated ONU 110 emulates the functions of a real ONU, such that the emulated ONU 110 interacts with the OLT 120 in the same way as a real ONU. However, an emulated ONU 110 is not field-deployable but instead it operates according to profiles that are configurable to characterize the emulated ONU 110 as any one of ONU types, including SFUs and MDUs, with different types of ports and interfaces, different number of ports per port type, and the like. The different types of ports and interfaces may include but are not limited to, Gigabit Ethernet (GbE) ports, Fast Ethernet ports, plain-old telephone system (POTS) ports, E1/T1 ports, universal serial bus (USB) ports, very-high-bit-rate digital subscriber line (VDSL) ports, and the like. Also, each emulated ONU 110 can emulate an ONU type, such as SFU or MDU with some variations of supported features. For example, some of the emulated ONUs 110 may have support for wireless interfaces (e.g., Wi-Fi), radio frequency (RF) videos, and/or residential gateway capabilities, while some of the emulated ONUs 110 may not have one or more of these supports. The different ONU types being emulated can also include some variation in supported features; for example, some features may be supported by newer versions of a given ONU type only, and some advanced features may be supported by a given ONU type but not supported in other ONU types. Different emulated ONUs 110 can emulate different types of ONUs such that the operation and performance of the GPON system 100 can be evaluated under a controlled load condition.

By way of example but not limitation, the OLT 120 shown in FIG. 1 includes multiple OLT packs 121 and controller packs 122 arranged in a chassis. Each OLT pack 121 includes multiple OLT ports 123 for connecting to the real and emulated ONUs 110 and 112. In one embodiment, the OLT 120 may include two controller packs 122 and fourteen OLT packs 121. Each OLT pack 121 may include sixteen OLT ports 123, and each OLT port 123 may connect to sixty-four ONUs (including real and emulated ONUs). In different embodiments, an OLT may have different numbers of OLT packs and OLT ports, and each OLT port may be connected to a different number of real and emulated ONUs.

Figure 2:
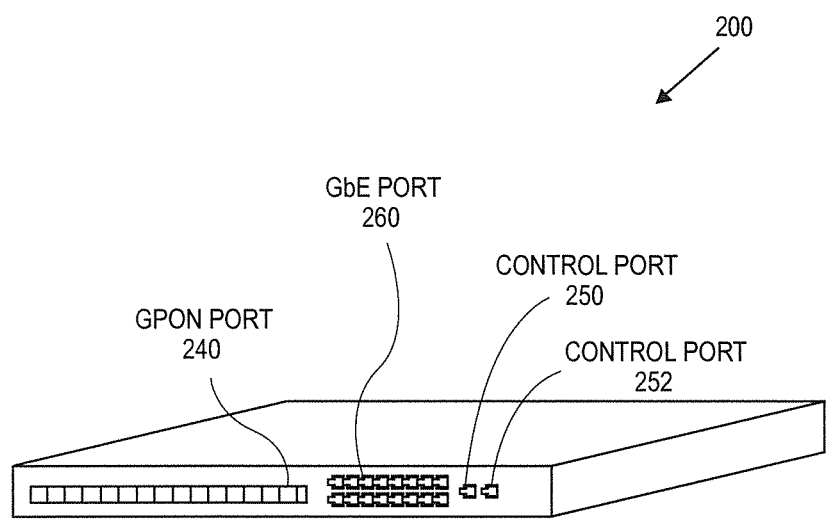
FIG. 2 illustrates an example of an emulated ONU platform according to one embodiment of the invention.

FIG. 2 illustrates an example of an emulated ONU platform 200, which can be configured as a collection of mixed types of emulated ONUs, such as any of the emulated ONUs 110 shown in FIG. 1. The emulated ONU platform 200 includes multiple GPON ports 240 for connecting to an OLT (e.g., the OLT 120 of FIG. 1), and multiple control ports 250 and 252 for connecting to external control entities, such as a central management system and a command line interface (CLI), for receiving commands and configuration inputs and outputting data logs and other information. In one embodiment, the emulated ONU platform 200 also includes multiple Gigabit Ethernet (GbE) ports 260 for connecting to an external traffic generator or analyzer. In one embodiment, the emulated ONU platform 200 includes eight GPON ports 240, sixteen gigabit ports 260 and two control ports 250; different embodiments may have different numbers of these ports.

Figure 3:
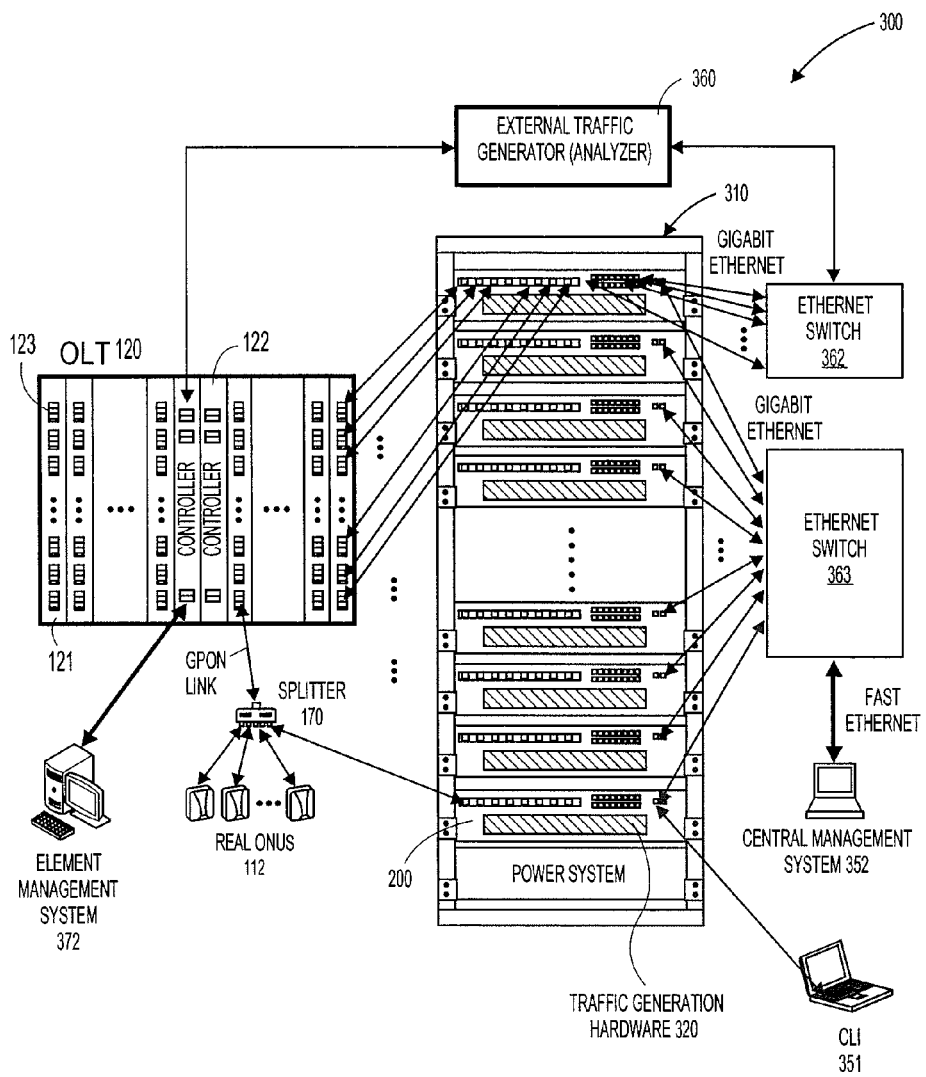
FIG. 3 illustrates further details of an ONU emulation system according to one embodiment of the invention.

FIG. 3 illustrates an example of a GPON emulation system 300 in which an ONU emulator 310 is deployed according to one embodiment. In the embodiment of FIG. 3A, the ONU emulator 310 includes multiple emulated ONU platforms 200, which can be stacked up one on top of another in a rack. Alternatively, the emulated ONU platforms 200 can be distributed across multiple locations or arranged in other kinds of physical frames or containers. Each of the emulated ONU platforms 200 includes traffic generation hardware 320 for generating emulated ONU traffic.

In this example and referred also to FIG. 2, the ONU emulator 310 is coupled to the OLT 120 via GPON ports 240, where each GPON port 240 can be connected to one of the OLT ports 123 via GPON links. The ONU emulator 310 is also coupled to an external traffic generator 360 via GbE ports 260. In one embodiment, the GbE ports 260 are connected to an external Ethernet switch module 362 via a GbE link. In one embodiment, the external traffic generator 360 can generate background network traffic as well as analyze the data exchanges between the OLT 120 and the ONU emulator 310. For example, the external traffic generator 360 can analyze the ONU upstream traffic received by the OLT 120, and the OLT downstream traffic received by the ONU emulator 310. It is understood that these connections are shown by way of example but not limitation; in alternative embodiments more or fewer connections may be established.

In one embodiment, the ONU emulator 310 can be connected to an external Ethernet switch module 363 via a GbE link. Through the external Ethernet switch module 363 and a fast Ethernet link, the ONU emulator 310 can communicate with a command line interface (CLI) 351 and a central management system 352. The CLI 351 manages the ONU emulator 110 such as start, shutdown, and reboot of ONU emulation. The CLI 351 also allows a user (e.g., a test engineer) to view the emulated ONU logs and status (e.g. the number of emulated ONUs, ONU types, operational status and the like) and to manage operations of the ONUs (e.g., create an ONU simulation profile, trigger actions on emulated ONUs and the like). The central management system 352 manages all of the ONU emulator instances. This management function can be performed through CLI-based automation scripts or a user-friendly graphical user interface (GUI).

The OLT 120 shown in FIG. 3 includes multiple OLT ports 123 in multiple OLT packs 121, and each OLT port 123 can be connected to multiple ONUs, including real ONUs and emulated ONUs. The controller packs 122 of the OLT 120 may be connected to the external traffic generator 360 and an element management system (EMS) 372. The EMS 172 manages and monitors the operations of the OLT 120 and the ONUs (real and emulated) that are coupled to the OLT 120.

Each OLT port 123 may be connected to real ONUs and emulated ONUs directly or via a splitter. In the embodiment of FIG. 3, some of the OLT ports 123 are directly connected to the GPON ports 240 of the ONU emulator 310 via GPON links, and some of the OLT ports 123 are connected to a combination of the real ONUs 112 and the GPON ports 240 of the ONU emulator 310 via one or more passive optical splitters (only one passive optical splitter 170 is shown). As shown in FIG. 3, the passive optical splitter 170 is connected to one of the OLT ports 123 via a GPON link shared by the real ONUs 112 and the ONU emulator 310. Thus, the performance of the OLT 120 can be tested under a variety of test conditions, including a combination of real network traffic and emulated network traffic. The OLT 120 can be tested under a controlled level of load, and the effect of the emulated network traffic on the OLT 120 and on the real ONUs 112 can be observed and analyzed.

The interconnection between the OLT 120 and the ONUs (real and emulated ONUs) is fully configurable. Each OLT port 123 may be connected, either directly or via a splitter, to any one of the GPON ports 240 in any one of the emulated ONU platforms 200. Similarly, each GPON port 240 in any one of the emulated ONU platforms 200 may be connected, either directly or via a splitter, to any one of the OLT ports 123 in any one of the OLT packs 121. The real ONUs 112 can be also connected to any one of the OLT ports 123 in any one of the OLT packs 121 either directly or via a splitter.

Figure 4:
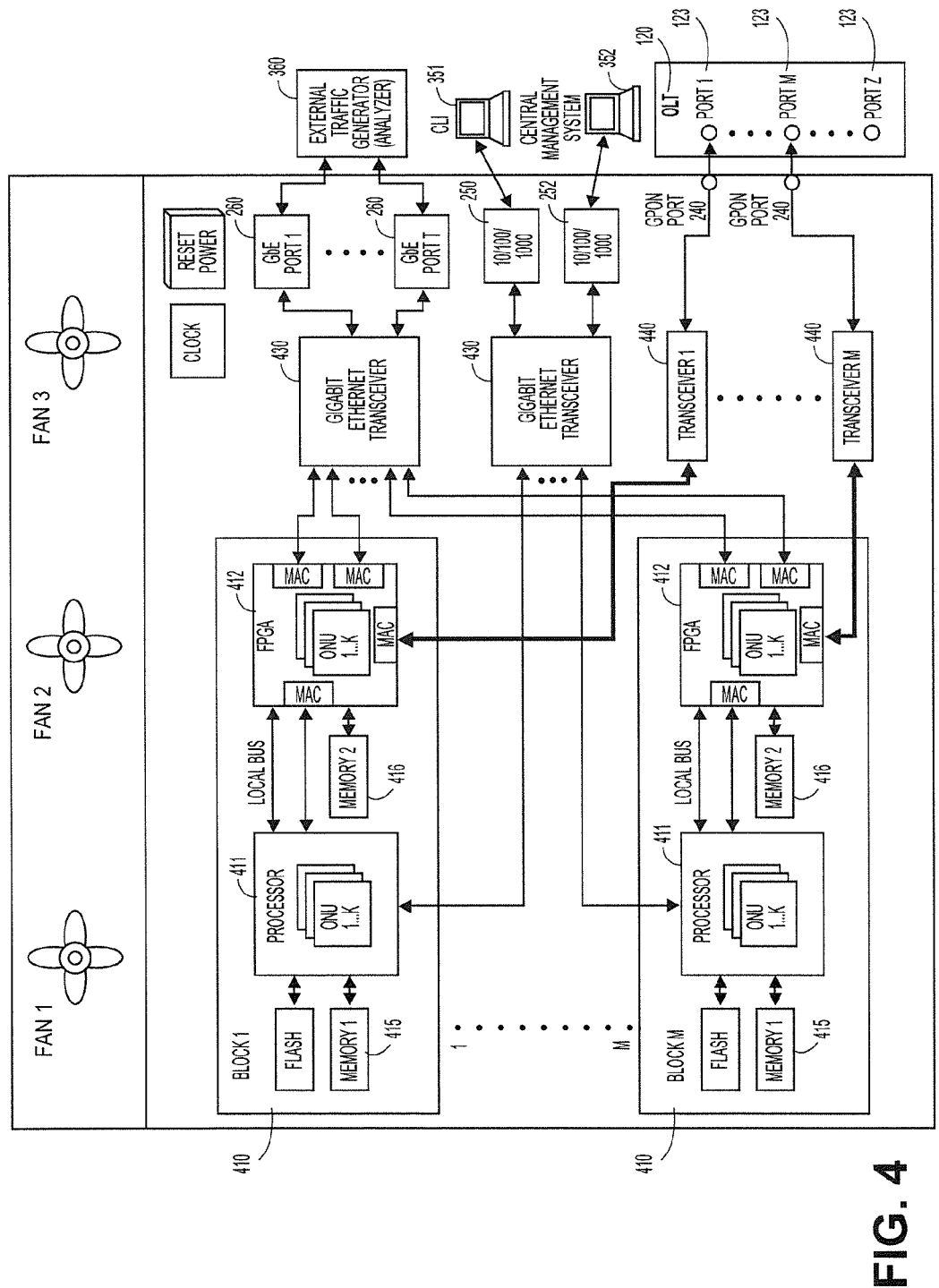
FIG. 4 illustrates an example of the circuitry within an emulated ONU platform according to one embodiment of the invention.

FIG. 4 illustrates the hardware architecture of an emulated ONU platform 200 according to one embodiment. In this embodiment, the emulated ONU platform 200 includes M ONU platform blocks 410, and each ONU platform block 410 emulates a group of K ONUs (where M and K are positive integers). Each ONU platform 200 can emulate the behavior of K×M ONUs simultaneously. In one embodiment, K=64 and M=8. In alternative embodiments K and M may be different numbers. The K ONUs can be configured as different types of ONUs (e.g., SFUs, MDUs, ONU for data services only and/or ONUs for data and voice services). The emulated traffic of the K ONUs can have mixed frame sizes, Virtual Local Area Network (VLAN) tags and QoS per user network interface (UNI). Each ONU platform block 410 is connected to a GPON port 240, which in turn can be connected to an OLT port 123. When the M ONU platform blocks 410 are connected to M OLT ports 123 (as shown in FIG. 4), these M OLT ports 123 can be in the same OLT pack 121 or in different OLT packs 121 (of FIG. 3).

When multiple emulated ONU platforms 200 perform ONU emulation simultaneously, upstream traffic (i.e., from an ONU to an OLT) can be generated with an aggregate capacity sufficient to oversubscribe the total upstream links. The responses from the OLT 120 can be used to evaluate the OLT's traffic control and management features (e.g., dynamic bandwidth allocation (DBA), bandwidth allocation limits, traffic prioritization, etc.) under overload conditions.

In the embodiment of FIG. 4, each ONU platform block 410 includes a processor 411 coupled to a specialized hardware device, such as a field-programmable gate array (FPGA) 412. Each processor 411 can be coupled to the CLI 351 and the central management system 352 via one of GbE transceivers 430 and control ports 250 and 252 (shown as 10/100/1000 ports 250 and 252). Each processor 411 is also coupled to a number of memory devices 415. Each processor 411 emulates the control and management functions of K ONUs at the same time.

In one embodiment, each processor 411 executes software that provides support for logging various events (Physical Layer Operations, Administration and Management (PLOAM) messages, ONU Management and Control Interface (OMCI) messages, reboot/shutdown events, etc.) for each emulated ONU, and sends the logged messages to a debug port. The logged messages can be analyzed by externally developed tool or utility.

In the embodiment of FIG. 4, each FPGA 412 includes four medium access control (MAC) ports. A first MAC port is connected to the processor 411 of the same group, a second MAC port is connected to a GPON transceiver 440 that can in turn be connected to one of the OLT ports 123, and third and fourth MAC ports are connected to the GbE transceivers 430 that can in turn be connected to the external traffic generator 360. Each FPGA 412 is also coupled to one or more memory devices 416. Each FPGA 412 includes an internal traffic generator (not shown) that emulates the traffic of K ONUs. In one embodiment, the FPGA 412 generates upstream high-speed Internet access (HSIA) traffic for the K ONUs to send to the OLT 120. The FPGA 412 may implement a GPON MAC, a GPON Transmission Convergence (GPON) Frame composer, and HSIA traffic generation for the K ONUs in the same ONU platform block 410. Additional functions may also be implemented by the FPGA 412.

In one embodiment, the processor 411 manages the profiles of the K ONUs in the same ONU platform block 410. The profiles may be stored in Management Information Bases (MIBs), and may be configurable by the CLI 351 and the central management system 352 to control the emulation of the K ONUs. The processor 411 is responsible for emulating system Operations, Administration and Management (OAM) functions, OMCI management, configuration management, and ONU control traffic generation for the K ONUs in the same ONU platform block 410. Examples of the control traffic may include IGMP, DHCP, PPPoE, ARP, and 802.1x/RADIUS traffic.

Figure 5:
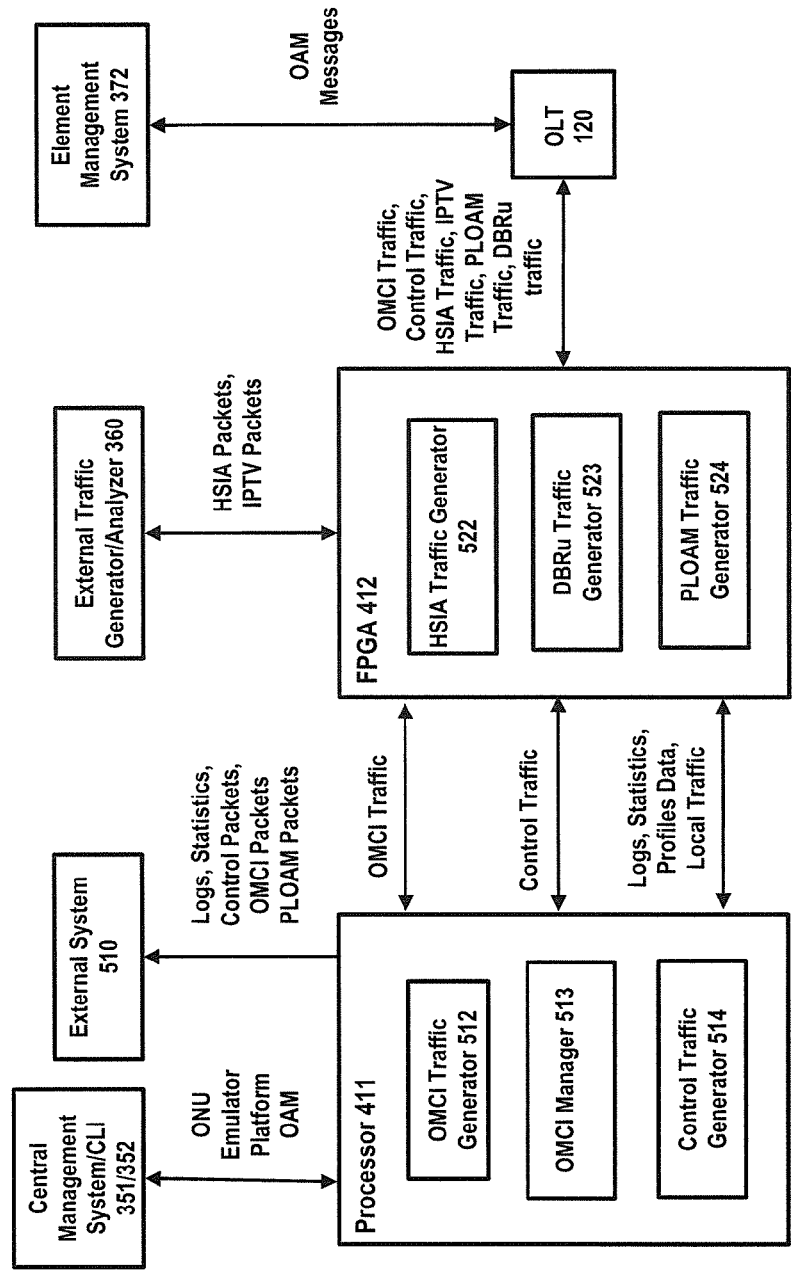
FIG. 5 is a diagram illustrating ONU traffic generation according to one embodiment of the invention.

FIG. 5 illustrates an embodiment of traffic generation architecture implemented in each ONU emulator block 410 (of FIG. 4) for emulating K ONUs. In this embodiment, the processor 410 of an ONU emulator block 410 includes an OMCI generator 512, an OMCI manager 513 and a control traffic generator 514. The FPGA 412 of the ONU emulator block 410 includes a HSIA traffic generator 522, a dynamic bandwidth report upstream (DBRu) traffic generator 523 and a PLOAM traffic generator 524. The processor 411 generates upstream OMCI traffic and control traffic and sends the generated traffic to the FPGA 412, which passes them to the OLT 120. The FPGA 412 generates upstream HSIA traffic, DBRu traffic and PLOAM traffic, and sends them to the OLT 120. The upstream traffic includes, but is not limited to, a mix of OMCI traffic, PLOAM traffic, HSIA traffic, control traffic and DBRu traffic. The processor 411 and the FPGA 412 also exchange logs, statistics, profile data and local traffic. Downstream traffic from the OLT 120 includes, but is not limited to, a mix of OMCI traffic, PLOAM traffic, HSIA traffic, Internet Protocol Television (IPTV) traffic, control traffic and DBA related traffic.

The processor 411 also exchange ONU emulator platform OAM messages with the central management system 351 and/or CLI 352. The processor 411 may also send logs, statistics, control packets, OMCI packets and PLOAM packets to an external system 510 for analysis. In some embodiments, the external system 510 may be the central management system 351. The FPGA 412 may forward the downstream HSIA traffic and IPTV packets from the OLT 120 to the external traffic generator (analyzer) 360 for analysis. The FPGA 412 may also receive HSIA traffic generated by the external traffic generator 360 and forward it as part of the upstream traffic to the OLT 120. The operation of the OLT 120, as well as its connection to the emulated ONUs, is managed by the element management system 372 by the exchange of OAM messages between the OLT 120 and the element management system 372.

Figure 6:
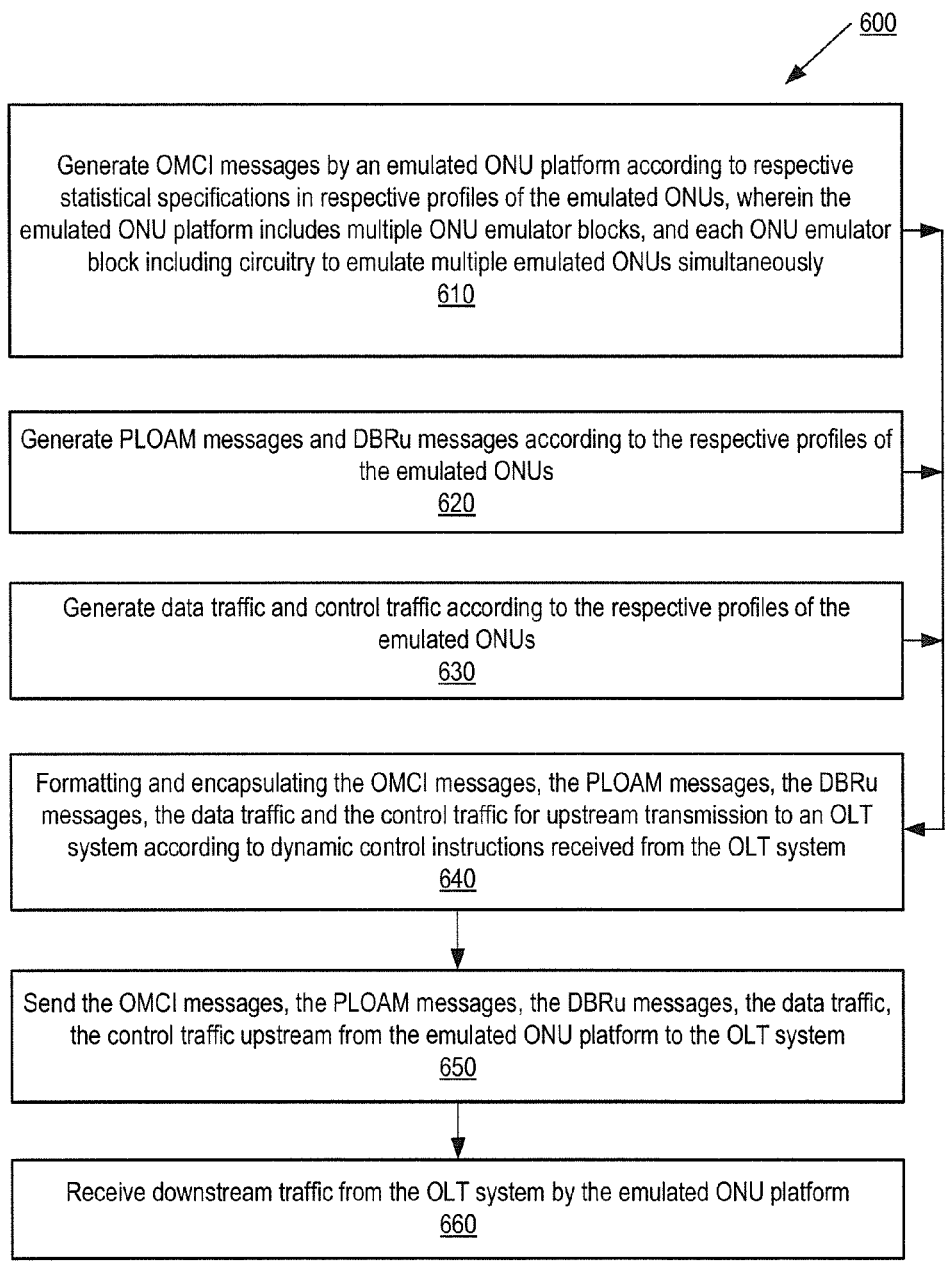
FIG. 6 is a flow diagram illustrating a method of emulating ONU traffic generation according to one embodiment of the invention.

FIG. 6 is a flow diagram illustrating a method 600 performed by an emulated ONU platform 200 (e.g., the emulated ONU platform 200 of FIG. 2). In one embodiment, the emulated ONU platform 200 includes multiple ONU emulator blocks 410 (FIG. 4), and each ONU emulator block 410 includes circuitry to emulate multiple emulated ONUs simultaneously. The emulated ONU platform 200 executes functions of a plurality of emulated ONUs to enable traffic emulation in a GPON system. Although the operation of one emulated ONU is described, it is understood that multiple emulated ONU platforms 200 may emulate traffic generation of multiple ONUs simultaneously.

In one embodiment, the emulated ONU platform 200 generates OMCI messages according to respective statistical specifications in respective profiles of the emulated ONUs (block 610). The OMCI messages include, but are not limited to, one or more of Threshold Crossing Alert (TCA) notifications, alarm notifications, Attribute Value Change (AVC) notifications, and Performance Management (PM) counters. These OMCI messages may be concurrently generated across any number of the ONU emulator blocks 410 and across any number of the emulated ONU platforms 200. The alarm notifications in the OMCI messages may include alarms that are synchronized across any number of the ONU emulator blocks 410 and across any number of the emulated ONU emulator platforms 200. The numbers of the ONU emulator blocks 410 and the emulated ONU platforms 200 may be specified (selected) by the respective profiles of the emulated ONUs and/or the test scenarios currently being executed. In one embodiment, the OMCI messages include emulated responses to messages and commands that were received from the OLT system, such as, but not limited to, configuration management, performance management and software downloads related commands.

The emulated ONU platform 200 also generates PLOAM messages and DBRu messages according to the respective profiles of the emulated ONUs (block 620). The PLOAM messages support various management functions of the GPON. In one embodiment, the PLOAM messages include emulated responses to messages and commands that were received from the OLT system. The DBRu messages are used by the OLT system for bandwidth allocation purposes.

The emulated ONU platform 200 also generates data traffic and control traffic according to the respective profiles of the emulated ONUs (block 630). An example of the data traffic may include HSIA traffic. The HSIA traffic may be transmitted in multiple frame sizes, with multiple Virtual Local Area Network (VLAN) tags and multiple levels of Quality of Service (QoS) per User Network Interface (UNI) of the emulated ONU platform 200. Examples of the control traffic may include IGMP, DHCP, PPPoE, ARP, and 802.1x/RADIUS traffic. In one embodiment, the data traffic and control traffic may be generated per UNI, per GPON Encapsulation Method (GEM) port ID and per Transmission Container (T-CONT). That is, each emulated ONU can be configured to have multiple T-CONTs, where each T-CONT has multiple GEM ports and is treated as a single entity for upstream bandwidth assignments. The GEM port ID is used to differentiate the upstream control traffic generated from each control traffic generation/handling instance. The GEM port ID is also used to differentiate the upstream data traffic generated from each data traffic generation/handling instance. Similarly, the same GEM port ID is used to differentiate the downstream control traffic addressed to each traffic generation/handling instance, and to differentiate the downstream data traffic addressed to each data traffic generation/handling instance. In one embodiment, the control traffic includes emulated responses to messages and commands that were received from the OLT system. Generation of the OMCI messages, PLOAM messages, DBRu messages, data traffic and control traffic may be concurrently or in any order. It is understood that the emulated ONU platform 200 may generate additional upstream traffic as necessary.

The emulated ONU platform 200 formats and encapsulates the OMCI messages, the PLOAM messages, the DBRu messages, the data traffic and the control traffic for upstream transmission to an OLT system according to dynamic (real-time) bandwidth allocation instructions received from the OLT system (block 640). The emulated ONU platform 200 then sends the OMCI messages, the PLOAM messages, the DBRu messages, the data traffic and the control traffic upstream to the OLT system (block 650). The emulated ONU platform 200 also receives downstream traffic from the OLT system (block 660).

In one embodiment, the profiles of an emulated ONU include an ONU emulation profile, which contains information such as: ONU unique information (e.g., serial number, MAC address, PLOAM password, etc.), ONU variant type (e.g., model, number of Ethernet UNI ports, Plain Old Telephone Service (POTS) ports, etc.), ONU status (e.g. enabled/disabled, activated/deactivated, ranged, in-service/out-of-service), software version, and the like. The ONU emulation profile may also specify the emulation triggers for triggering emulation events on the specified emulated ONU.

In one embodiment, the emulated ONU platform 200 receives the profiles, configuration and commands from the CLI 351 or the central management system 352, according to which the emulated ONUs are created to generate data, management and control traffic for transmission to an OLT. According to the profiles, the emulated ONU platform 200 may trigger concurrent shutdown, reboot, downloads, or upgrade of the emulated ONUs across a selected number of the ONU emulator blocks 410 and across a selected number of the ONU emulator platforms 200. According to the profiles, the emulated ONU platform 200 may also trigger synchronized initialization of the emulated ONUs across a selected number of the ONU emulator blocks and across a selected number of the ONU emulator platforms.

The emulated ONU platform 200 also handles the responses and queries from the OLT and the network. In one scenario, the responses from the OLT and the network may be forwarded by the ONUs to an external traffic generator (e.g., the external traffic generator 360 of FIG. 3), which analyzes the responses. In one embodiment, the external traffic generator 360 may generate data traffic and send the data traffic to one of the emulated ONU platforms 200, and the emulated ONU platform 200 passes that data traffic upstream to an OLT. The emulated ONU platform 200 may also receive emulated HSIA traffic from the external traffic generator 360 via a GbE port, and one or more of the ONU emulator blocks 410 may multiplex the emulated HSIA traffic with internally generated pseudo random data traffic. The multiplexed data traffic may then be sent upstream to the OLT system.

Figure 7:
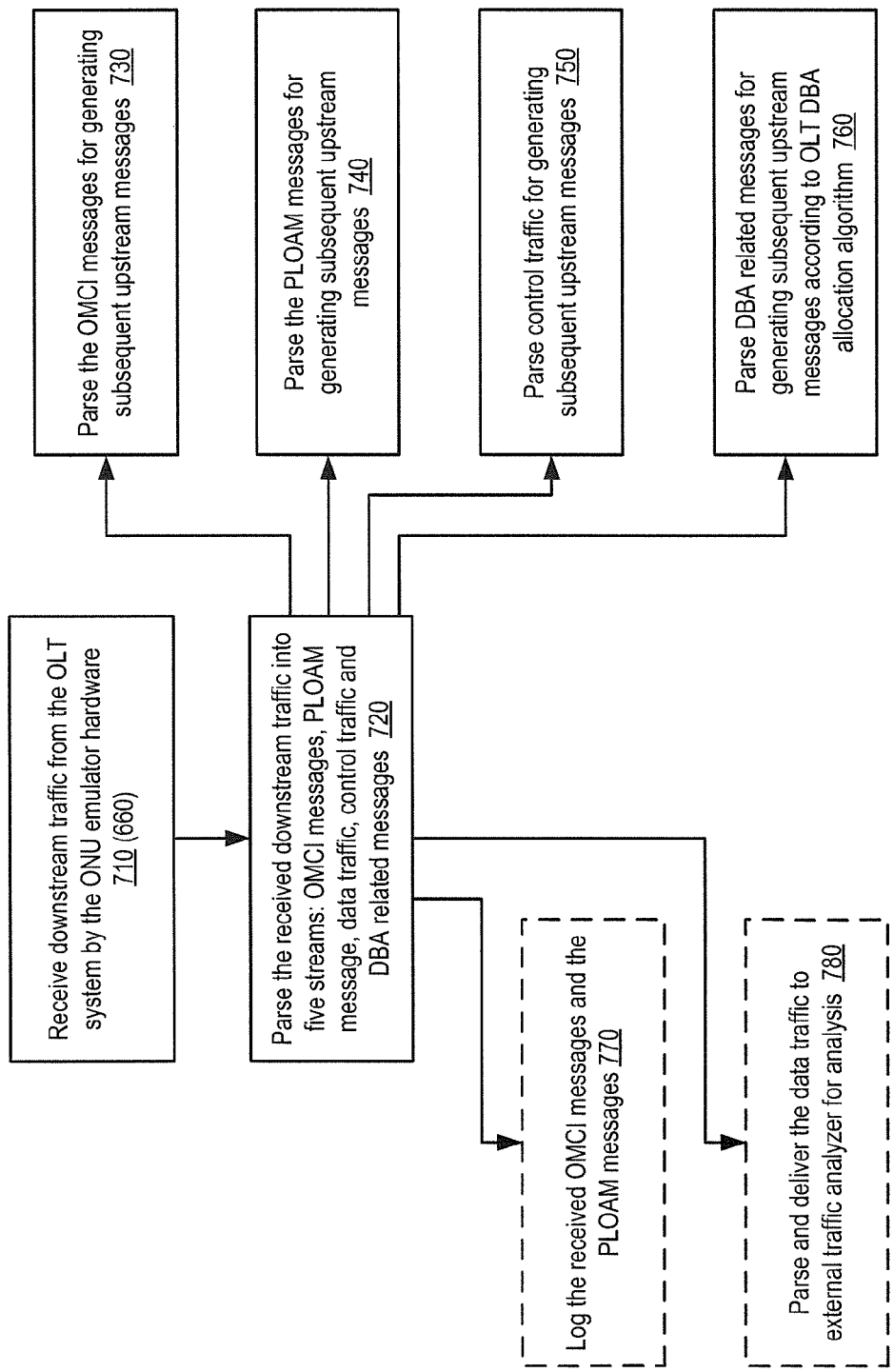
FIG. 7 is a flow diagram illustrating a method of processing downstream traffic according to one embodiment of the invention.

FIG. 7 is a diagram illustrating a process for the emulated ONU platform 200 to process downstream traffic received from an OLT according to one embodiment. Although only one emulated ONU platform is described in connection with FIG. 7, it is understood that the operation of the diagrams of FIG. 7 can be performed by multiple emulated ONU platforms concurrently.

In one embodiment, when the emulated ONU platform 200 receives downstream traffic from an OLT (710), it parses the received downstream traffic into five streams: OMCI messages, PLOAM message, data traffic, control traffic and DBA related messages (720). In particular, the emulated ONU platform 200 parses the OMCI messages for generating subsequent upstream frames in response to the OMCI messages (730). It parses the PLOAM messages for generating subsequent upstream frames in response to the PLOAM messages (740). It also parses the control packets for generating subsequent upstream frames in response to the control packets (750). It also parses the DBA related messages for generating subsequent upstream traffic according to the DBA allocation algorithm at the OLT (750). In some embodiments, the emulated ONU platform 200 may log the received the OMCI messages and the PLOAM messages (770). The logging of the OMCI messages and the PLOAM messages may be enabled/disabled by the operator of the emulated ONU platform 200. In some embodiments, the emulated ONU platform 200 parses the data traffic and may deliver the data traffic to an external traffic analyzer for analysis of the test results (780). The delivery of the data traffic to an external traffic analyzer may be enabled/disabled by the operator of the emulated ONU platform 200. If this feature (data traffic delivery) is disabled, the emulated ONU platform 200 may drop the received data traffic. In this illustrated embodiment, blocks 770 and 780 are shown in dotted boxes to indicate that the operations of 770 and 780 can be optional.

Figure 8:
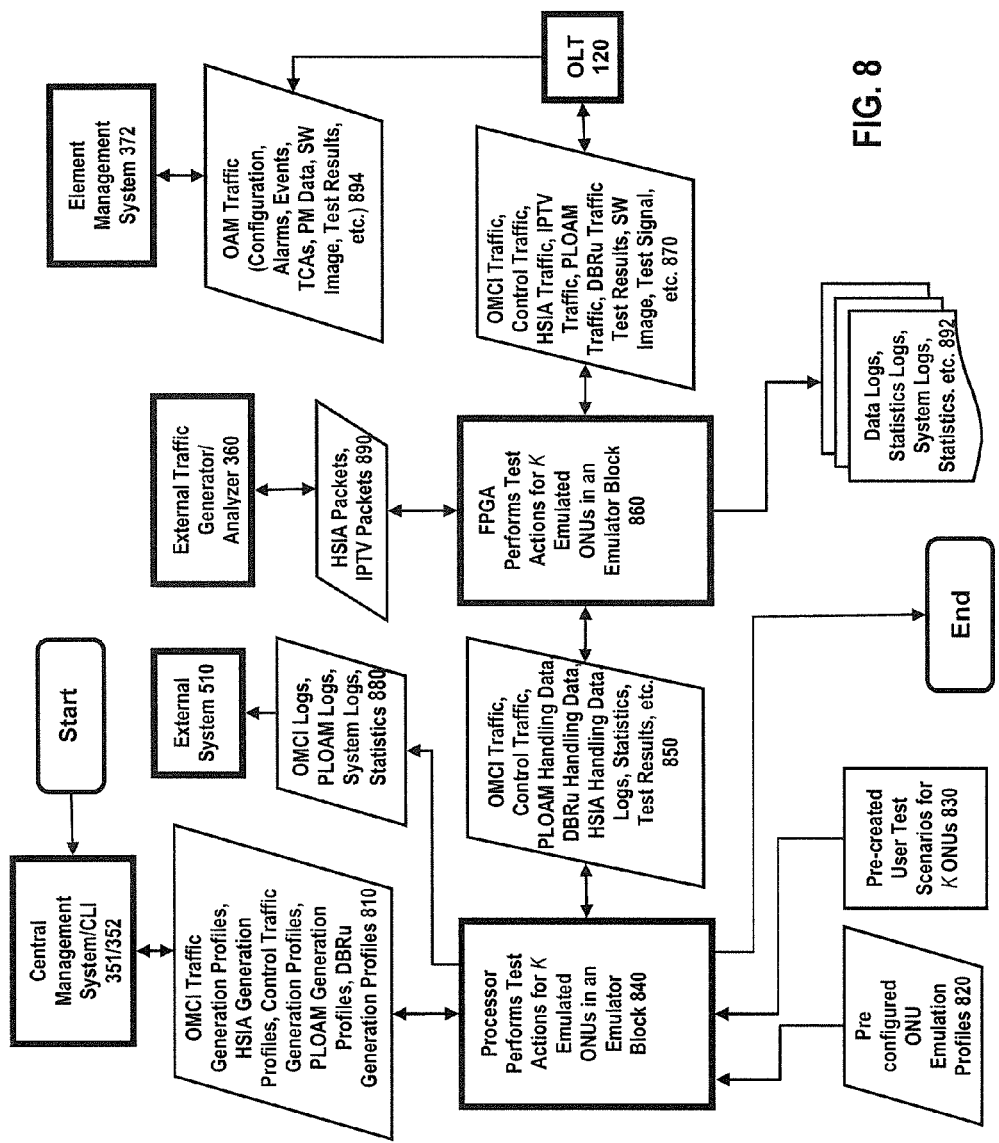
FIG. 8 is a diagram illustrating an ONU traffic generation process according to one embodiment of the invention.

FIG. 8 illustrates an example process for executing ONU emulator traffic generation test scenarios. Although the operation of one processor and one FPGA is described herein, it is understood that the processors and the FPGAs of one or more emulated ONU platforms may perform the same or similar operations concurrently.

The process starts with the processor 411 receiving a number of profiles from the central management system 351 and/or CLI 352. The profiles include, but are not limited to, OMCI traffic generation profiles, HSIA generation profiles, control traffic generation profiles, PLOAM traffic generation profiles, DBRu traffic generation profiles (810). These received profiles may overwrite or supplement pre-configured ONU emulation profiles (820) and pre-created user test scenarios (830). The processor 411 then executes traffic generation software to perform test actions for K emulated ONUs in an emulator block 410 (840). The processor 411 passes OMCI traffic and control traffic to the FPGA 412 (850), according to which the FPGA 412 performs test actions for K emulated ONUs in the emulator block 410 (860).

During the operation, the processor 411 and the FPGA 412 exchange PLOAM handling data, DBRu handling data, HSIA traffic handling data, logs and statistics, test results, etc. (850). The FPGA 412 sends the OMCI traffic, control traffic, HSIA traffic, PLOAM traffic, DBRu traffic to the OLT 120 (870). The OLT 120 also sends OMCI traffic, control traffic, HSIA traffic, IPTV traffic, PLOAM traffic, DBA related traffic to the FPGA 412 (870). Additional information, such as test results, software image, test signals, etc., may also be exchanged between the FPGA 412 and the OLT 120 (870).

The processor 411 may also send OMCI logs, PLOAM logs, system logs and statistics to an external system 510 for analysis (880). The FPGA 412 may forward the downstream HSIA traffic and IPTV packets from the OLT 120 to the external traffic generator (analyzer) 360 for analysis (890). The FPGA 412 may also receive HSIA traffic generated by the external traffic generator 360 (890) and forward it as part of the upstream traffic to the OLT 120. The FPGA 412 may store data logs, statistics logs, system logs, statistics and the like, in a local or remote storage (892).

The operation of the OLT 120, as well as its connection to the emulated ONUs, is managed by the element management system 372 by the exchange of OAM messages between the OLT 120 and the element management system 372 (894). The OAM messages may include configuration, alarms, events, Threshold Crossing Alerts (TCAs), performance management data, software images, test results, and the like.

The operations of the diagrams of FIGS. 5-8 have been described with reference to the exemplary embodiment of FIGS. 1-4. However, it should be understood that the operations of the diagrams of FIGS. 5-8 can be performed by embodiments of the invention other than those discussed with reference to FIGS. 1-4, and the embodiments discussed with reference to FIGS. 1-4 can perform operations different than those discussed with reference to the diagrams of FIGS. 5-8. While the diagrams of FIGS. 5-8 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network node). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware As used herein, a network node (e.g., a router, switch, bridge, controller) is a piece of networking equipment, including hardware and software, that communicatively interconnects other equipment on the network (e.g., other network nodes, end stations). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network nodes, which are coupled (e.g., through one or more core network nodes) to other edge network nodes, which are coupled to other end stations (e.g., server end stations).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by an emulated Optical Network Unit (ONU) platform that executes functions of a plurality of emulated ONUs to thereby enable traffic emulation in a Gigabit-capable Passive Optical Network (GPON), the GPON including an Optical Line Termination (OLT) system coupled to the emulated ONU platform, the method comprising the steps of:

generating a plurality of ONU management control interface (OMCI) messages by the emulated ONU platform according to respective statistical specifications in respective profiles of the plurality of emulated ONUs, wherein the emulated ONU platform includes a plurality of ONU emulator blocks, and each of the ONU emulator blocks including circuitry to emulate multiple ones of the emulated ONUs simultaneously;

generating a plurality of Physical Layer Operation, Administration and Maintenance (PLOAM) messages and a plurality of Dynamic Bandwidth Report upstream (DBRu) messages by the emulated ONU platform according to the respective profiles of the emulated ONUs;

generating data traffic and control traffic according to the respective profiles of the emulated ONUs;

formatting and encapsulating the OMCI messages, the PLOAM messages, the DBRu messages, the data traffic and the control traffic for upstream transmission to the OLT system according to dynamic bandwidth allocation instructions received from the OLT system;

sending the OMCI messages, the PLOAM messages, the DBRu messages, the data traffic and the control traffic upstream from the emulated ONU platform to the OLT system; and receiving downstream traffic from the OLT system by the emulated ONU platform.

2. The method of claim 1, wherein the data traffic includes a plurality of frame sizes, a plurality of Virtual Local Area Network (VLAN) tags and a plurality of levels of Quality of Service (QoS) per User Network Interface (UNI) of the emulated ONU platform.

3. The method of claim 1, wherein the step of generating the OMCI messages further comprises the step of generating synchronized alarms across a selected number of ONU emulator blocks and across a selected number of emulated ONU platforms.

4. The method of claim 1, wherein the step of generating the OMCI messages further comprises the step of concurrently generating one or more of Threshold Crossing Alert (TCA) notifications, alarm notifications, Attribute Value Change (AVC) notifications and Performance Management (PM) counters across a selected number of ONU emulator blocks and across a selected number of emulated ONU platforms.

5. The method of claim 1, wherein the OMCI messages, the PLOAM messages and the control traffic include emulated responses to messages and commands that were received from the OLT system.

6. The method of claim 1, further comprising the step of generating the data traffic and control traffic per UNI, per GPON Encapsulation Method (GEM) port ID and per Transmission Container (T-CONT).

7. The method of claim 1, further comprising the step of triggering one or more of the following: concurrent shutdown, reboot, downloads, and upgrade of the emulated ONUs across a selected number of ONU emulator blocks and across a selected number of emulated ONU platforms.

8. The method of claim 1, further comprising the step of triggering synchronized initialization of the emulated ONUs across a selected number of ONU emulator blocks and across a selected number of emulated ONU platforms.

9. The method of claim 1, further comprising the step of generating the OMCI messages, the PLOAM messages, the DBRu messages, the data traffic and the control traffic by the emulated ONUs in one or more of the ONU emulator blocks on the emulated ONU platform.

10. The method of claim 1, further comprising the steps of:

receiving by one of the ONU emulator blocks external High-Speed Internet Access (HSIA) traffic from an external traffic generator via a gigabit Ethernet port of the emulated ONU platform;

multiplexing the external HSIA traffic with internally generated pseudo random data traffic by respective ONU emulator blocks to form multiplexed data traffic; and forwarding the multiplexed data traffic upstream to the OLT system.

11. An emulated Optical Network Unit (ONU) platform for emulating traffic in a Gigabit-capable Passive Optical Network (GPON), the GPON including an Optical Line Termination (OLT) system coupled to the ONU emulator hardware that executes a plurality of emulated ONUs, the emulated ONU platform comprising:

a plurality of ONU emulator blocks;

memory within each of the ONU emulator blocks to store profiles of the plurality of emulated ONUs;

traffic generation hardware within each of the ONU emulator blocks to emulate multiple ones of the emulated ONUs simultaneously, the traffic generation hardware adapted to:

generate a plurality of ONU management control interface (OMCI) messages according to statistical specifications in respective profiles of the emulated ONUs, generate a plurality of Physical Layer Operation, Administration and Maintenance (PLOAM) messages and a plurality of Dynamic Bandwidth Report upstream (DBRu) messages according to the respective profiles of the emulated ONUs, generate data traffic and control traffic according to the respective profiles of the emulated ONUs, and format and encapsulate the OMCI messages, the PLOAM messages, the DBRu messages, the data traffic and the control traffic for upstream transmission to an OLT system according to dynamic bandwidth allocation instructions received from the OLT system; and a plurality of GPON ports adapted to send the OMCI messages, the PLOAM messages, the DBRu messages, the data traffic and the control traffic upstream to the OLT system and to receive downstream traffic from the OLT system.

12. The ONU emulator of claim 11, wherein the data traffic includes a plurality of frame sizes, a plurality of Virtual Local Area Network (VLAN) tags and a plurality of levels of Quality of Service (QoS) per User Network Interface (UNI) of the emulated ONU platform.

13. The ONU emulator of claim 11, wherein the OMCI messages comprise synchronized alarms across a selected number of the ONU emulator blocks and across a selected number of the emulated ONU platforms.

14. The ONU emulator of claim 11, wherein the traffic generation hardware across a selected number of ONU emulator blocks and across a selected number of emulated ONU platforms is adapted to concurrently generate the OMCI messages that include one or more of Threshold Crossing Alert (TCA) notifications, alarm notifications, Attribute Value Change (AVC) notifications and Performance Management (PM) counters.

15. The ONU emulator of claim 11, wherein the OMCI messages, the PLOAM messages and the control traffic include emulated responses to messages and commands that were received from the OLT system.

16. The ONU emulator of claim 11, wherein the traffic generation hardware is adapted to generate the data traffic and the control traffic per UNI, per GPON Encapsulation Method (GEM) Port ID and per transmission Container (T-CONT).

17. The ONU emulator of claim 11, wherein the traffic generation hardware across a selected number of ONU emulator blocks and across a selected number of emulated ONU platforms is adapted to trigger one or more of the following: concurrent shutdown, reboot, downloads, and upgrade of the emulated ONUs.

18. The ONU emulator of claim 11, wherein the traffic generation hardware across a selected number of ONU emulator blocks and across a selected number of emulated ONU platforms is adapted to trigger synchronized initialization of the emulated ONUs.

19. The ONU emulator of claim 11, wherein the traffic generation hardware is adapted to generate the OMCI messages, the PLOAM messages, the DBRu messages, the data traffic and the control traffic for the emulated ONUs in one or more of the ONU emulator blocks on the emulated ONU platform.

20. The ONU emulator of claim 11, further comprising a plurality of gigabit Ethernet ports coupled to an external traffic generator, wherein the traffic generation hardware in each of the ONU emulator blocks is adapted to receive external High-Speed Internet Access (HSIA) traffic from the external traffic generator via one of the gigabit Ethernet ports, multiplex the external HSIA traffic with internally generated pseudo random data traffic to form multiplexed data traffic, and forward the multiplexed data traffic upstream to the OLT system.

* * * * *